Patented Nov. 10, 1942

2,301,333

UNITED STATES PATENT OFFICE 2,301,333

METALIZABLE AZO DYESTUFFS

Max Schmid, Richen, near Basel, Switzerland, assignor to the firm of Society of Chemical Industry in Basle, Basel, Switzerland No Drawing. Application December 20, 1940, Serial No. 371,057. In Switzerland October 3, 1936

7 Claims. (Cl. 260—153)

This application is a continuation-in-part of my application for patent Serial No. 319,810, filed in the U. S. A. on February 19, 1940, which is itself a continuation-in-part of my application for patent Serial No. 166,021, filed in the U. S. A. on September 27, 1937, and in Switzerland on October 3, 1936.

According to this invention valuable azo-dyestuffs are obtained by causing a diazo-compound of the benzene and naphthalene series which contains in ortho-position to the diazo-group a substituent which is capable of forming stable lakes with the azo-group formed, such as an ortho-hydroxy or ortho-carboxy-diazo compound to react with a 1-aryl-5-pyrazolone which itself is obtainable by condensation of a β-carbonyl-carboxylic acid ester with a hydrazine of the general formula

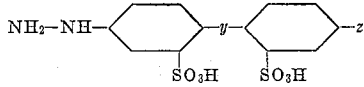

in which $y$ represents a —CH=CH-group or a —CH$_2$—CH$_2$-group and $z$ represents a group which is formed by reduction of a nitro-group in combination with a condensation, such as an amino-group substituted by the residue of an organic acid. The new azo-dyestuffs thus obtained are distinguished by their affinity for vegetable fibres, such as cotton, flax, ramie, and for fibres of regenerated cellulose, such as rayons, for example viscous rayon or cuprammonium rayon and by the capability of the dyeings thus obtained being after-treated with agents yielding metal, whereby their fastness properties, particularly their fastness to light and in certain cases also their fastness to washing may be improved considerably.

Among the ortho-hydroxy and ortho-carboxy-diazo compounds which come nito consideration for the preparation of the azo-dyestuffs forming the parent materials of the invention there may be named quite generally those derived from ortho-aminophenols or ortho-aminonaphthols or from ortho-aminocarboxylic acids of the benzene or naphthalene series, for example 1-hydroxy-2-aminobenzene, 1-hydroxy-2-amino-4-chlorbenzene, 1-hydroxy-2-amino-4-nitrobenzene, 1-hydroxy-2-amino-5-nitrobenzene, 1 - hydroxy - 2 - amino-4:6-dinitrobenzene, 1-hydroxy-2-amino-5-nitro-6-chlorbenzene, 1-hydroxy-2-amino-4-methyl-benzene, 1-hydroxy-2-amino-4-nitro-6-chlorbenzene, 1-hydroxy-2-amino - 4 - nitrobenzene-6-sulfonic acid, 1-hydroxy-2-amino-6-nitrobenzene-4-sulfonic acid, 1-hydroxy-2-aminobenzene - 4 - sulfamide, 1-hydroxy - 2 - aminonaphthalene-4:8-disulfonic acid, 2-hydroxy-1-aminonaphthalene-4-sulfonic acid, 2-hydroxy-1-amino-6-nitronaphthalene-4-sulfonic acid, 1-aminobenzene-2-carboxylic acid, 1-amino-4-chlorbenzene-2-carboxylic acid, 1-amino-4-nitrobenzene-2-carboxylic acid, 1-amino-4-benzolamino-2-carboxylic acid, 4-amino - 3 - carboxylic-azobenzene-4'-sulfonic acid, aminosulfobenzoic acid (NH$_2$:1, COOH:2, SO$_3$H:4), 2-aminonaphthalene-3-carboxylic acid, and so on.

Among the β-carbonyl-carboxylic acid esters available for preparing the 1-aryl-5-pyrazolones which can be used for the synthesis of the parent dyestuffs there may be named formyl acetic acid esters, furthermore β-keto-carboxylic acid esters, such as ethyl-aceto-acetate, ethyloxal acetate, ethylbenzolacetate, terephthaloyldiacetic acid ethyl ester, and so on. Among the hydrazines which likewise are used for preparing the 1-aryl-5-pyrazolones used for the synthesis of the parent dyestuffs there may be named such products as:

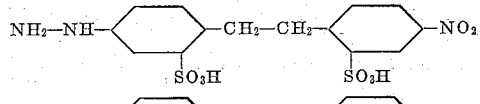

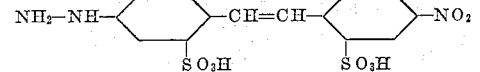

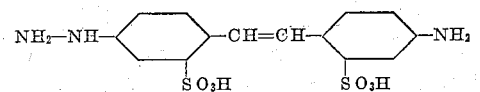

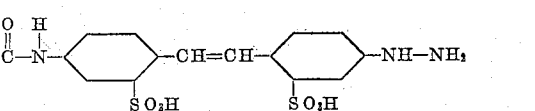

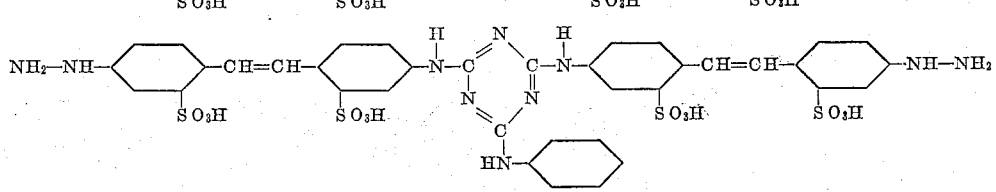

Quite generally, however, it is more advantageous first to combine the nitrohydrazine or the aminohydrazine with one of the aforesaid β-carbonyl-carboxylic acid esters and then to conduct the reduction of the nitro-group in combination with a condensation reaction. This operation may consist in complete reduction of the nitro-group to the NH₂-group and subsequent condensation, for example with a halogen compound which converts the NH₂-group into a $$NH-\underset{a}{\overset{|}{C}}-b-$$

group in which $a$ stands for metalloid whose atomic weight is not less than 14 and not greater than 16, and $b$ stands for an organic residue of the aliphatic, aromatic, cycloaliphatic, heterocyclic, araliphatic series and so on. Such products constitute acyl derivatives or the amidines which chemically are closely related thereto. As is known, the introduction of such residues into intermediate products or dyestuffs increase the affinity for vegetable fibre. Such residues can be introduced by acylation, for example by treatment with benzoyl chloride, phenylacetyl chloride, cinnamyl chloride, succinyl chloride, butyryl chloride, hexahydro-benzoyl chloride, furane-carboxylic acid chloride, benzimino ether, and particularly by treatment with phosgene or thiophosgene or by treatment with heterocyclic products of the nature of amidine halides, such as cyanuric acid chloride, cyanuric acid bromide, tribromopyrimidine, 2:6-dichloro-4-methylpyridine, dichloroquinazoline, and so on.

Particularly valuable products result when the condensation is conducted in such a manner that the residue $b$ is so constituted that it contains an azochromophore or is adapted to couple with diazo compounds to produce azo-dyestuffs. There are thus obtained 1-aryl-5-pyrazolones in which the aryl residue has the general formula

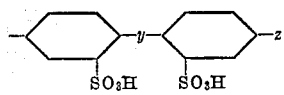

in which $y$ stands for a —CH=CH— or a —CH₂—CH₂-group and $z$ stands for a group which is formed by reduction of a nitro-group in combination with a condensation. Such pyrazolone derivatives are, for example:

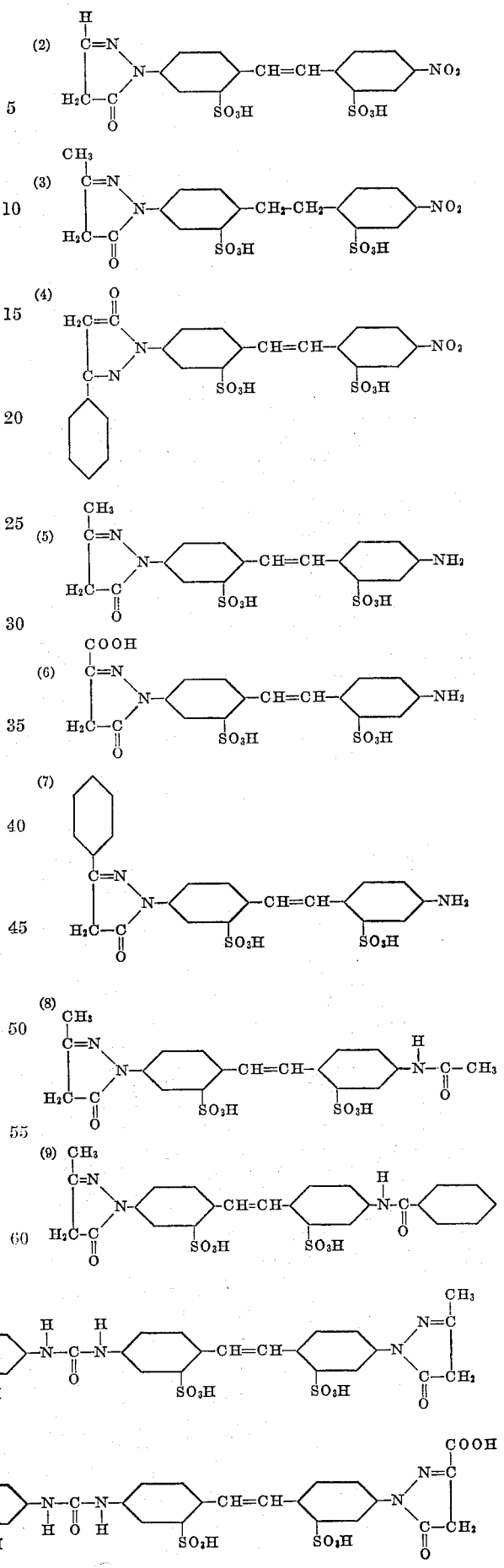

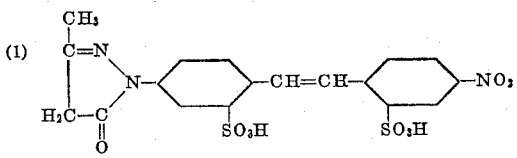

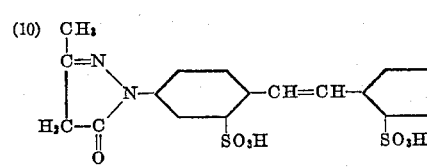

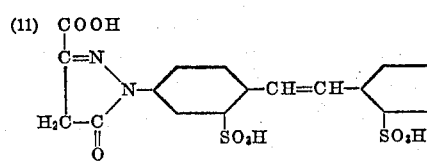

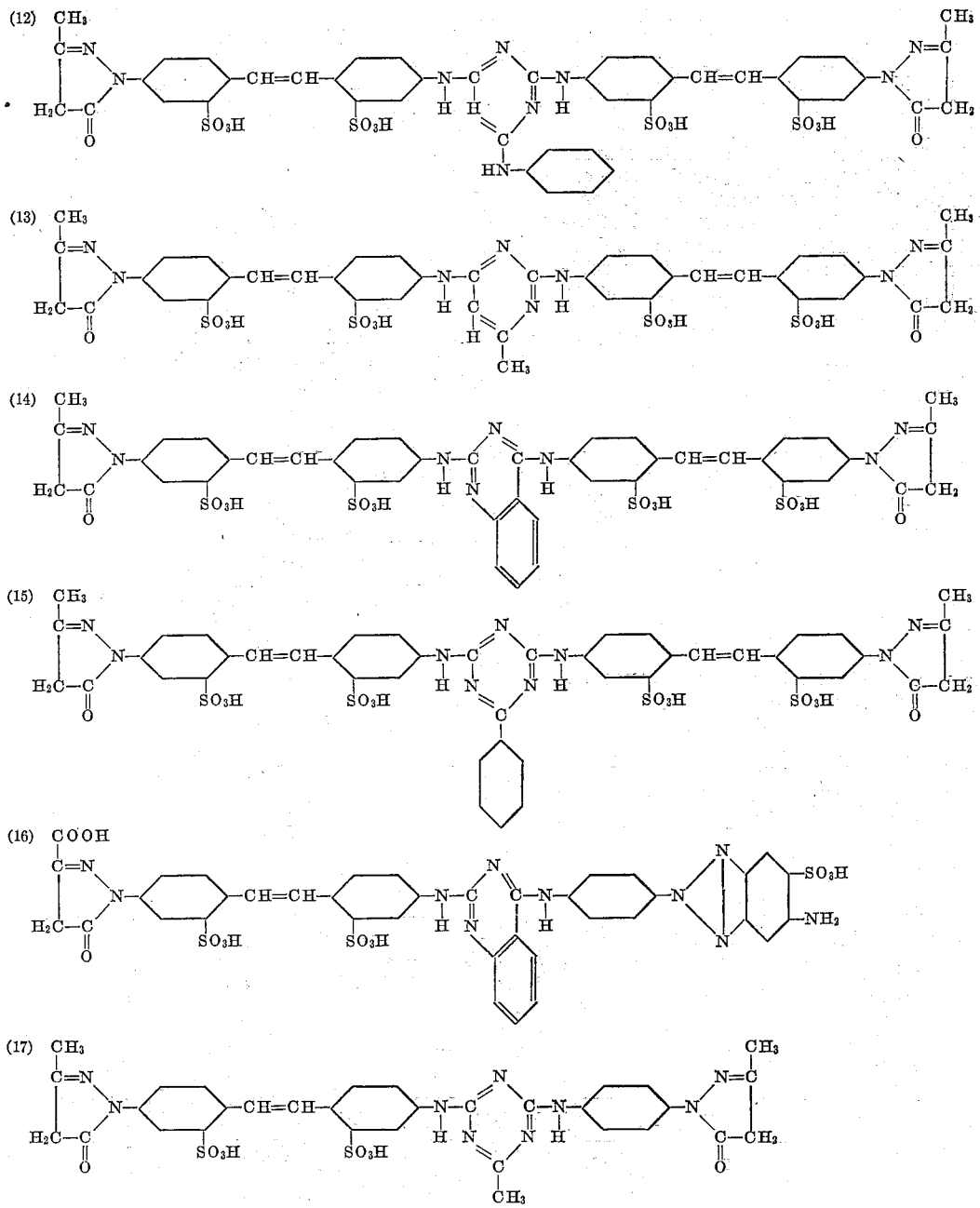

From a comparison of the pyrazolone nuclei of the products of the Formulae 1–7 with those of the products resulting from the reduction of a nitro-group together with a condensation shown in Formulae 5–17, all of which are given by way of example, it is evident how numerous are the intermediate products for making the azo-dyestuffs forming the invention; regard must further be had to the fact that the aryl residue of the pyrazolones may belong either to the stilbene or to the dibenzyl series. It is also possible first to convert the 1-aryl-5-pyrazolones from the aforesaid nitro- or amino-hydrazines by coupling with one of the diazo compounds already referred to into azo-dyestuffs of the general formula:

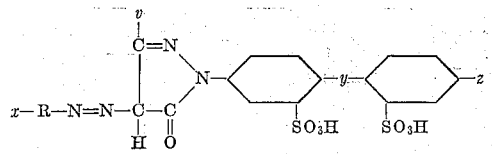

in which R stands for an aromatic nucleus of the benzene or naphthalene series, $x$ stands for an OH- or a COOH-group which stands in ortho-position to the —N=N-group, $v$ stands, for instance, for hydrogen, alkyl, aryl, COOH or COOR' (R'=alkyl), $y$ for a CH=CH- or a $CH_2$—$CH_2$-group, and $z$ for a $NO_2$- or $NH_2$-group, and then to proceed with the conversion of the nitro- or amino-group.

The combination of the aforesaid coupling components and diazotized ortho-hydroxylated or ortho-carboxylated diazotization components to produce azo-dyestuffs proceeds, as is usual for pyrazolones, in an acid or an alkaline medium. As will be apparent from the foregoing formulae of the coupling components, besides the formation of the pyrazolone-azo-dyestuff a further azo-dyestuff formation may occur, for example with the residue of one of the aminophenol- or amino-hydroxynaphthalene derivatives named (see for instance Formulae 13 and 20). In this case it is possible to prepare as may be desired mixed dyestuffs in respect of the diazotization components, since, apart from the different coupling powers of the diazo components, the coupling powers of the various residues of the coupling components are also different. Thus, quite generally the diazotized ortho-aminocarboxylic acids couple more easily than the diazotized ortho-aminohydroxy compounds and the pyrazolones more easily than the 1-hydroxynaphthalene-3-sulfonic acid residues. Thus, by combining 1 mol of diazotized 1-amino-benzene-2-carboxylic acid in an acetic acid medium with 1 mol of the compound of the Formula 19, and then combining the mono-azo-dyestuff further in an alkaline medium with 1 mol of diazotized 1-hydroxy-2-aminobenzene-4-sulfonic acid, there is produced a dyestuff of the formula:

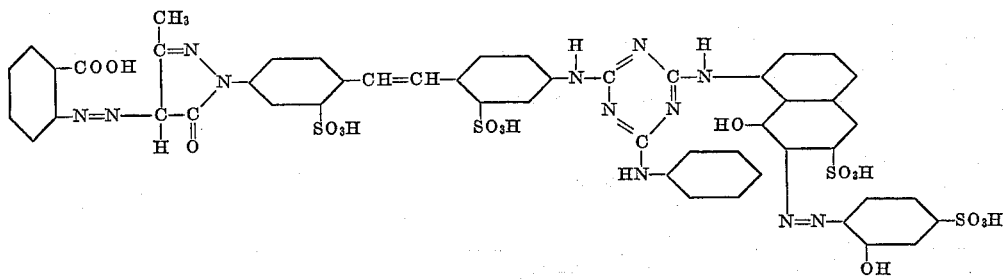

Reference must also be made to the further possibilities afforded by the diazo components hereinbefore mentioned and the formulae of the coupling components given by way of example.

The dyestuffs of the present invention are accordingly azo-dyestuffs of the general formula

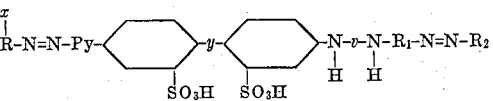

in which $x$ stands for a substituent in ortho-position to the N=N-group which is capable of forming complex compounds with metals, Py The new azo-dyestuffs have for instance the following formulas:

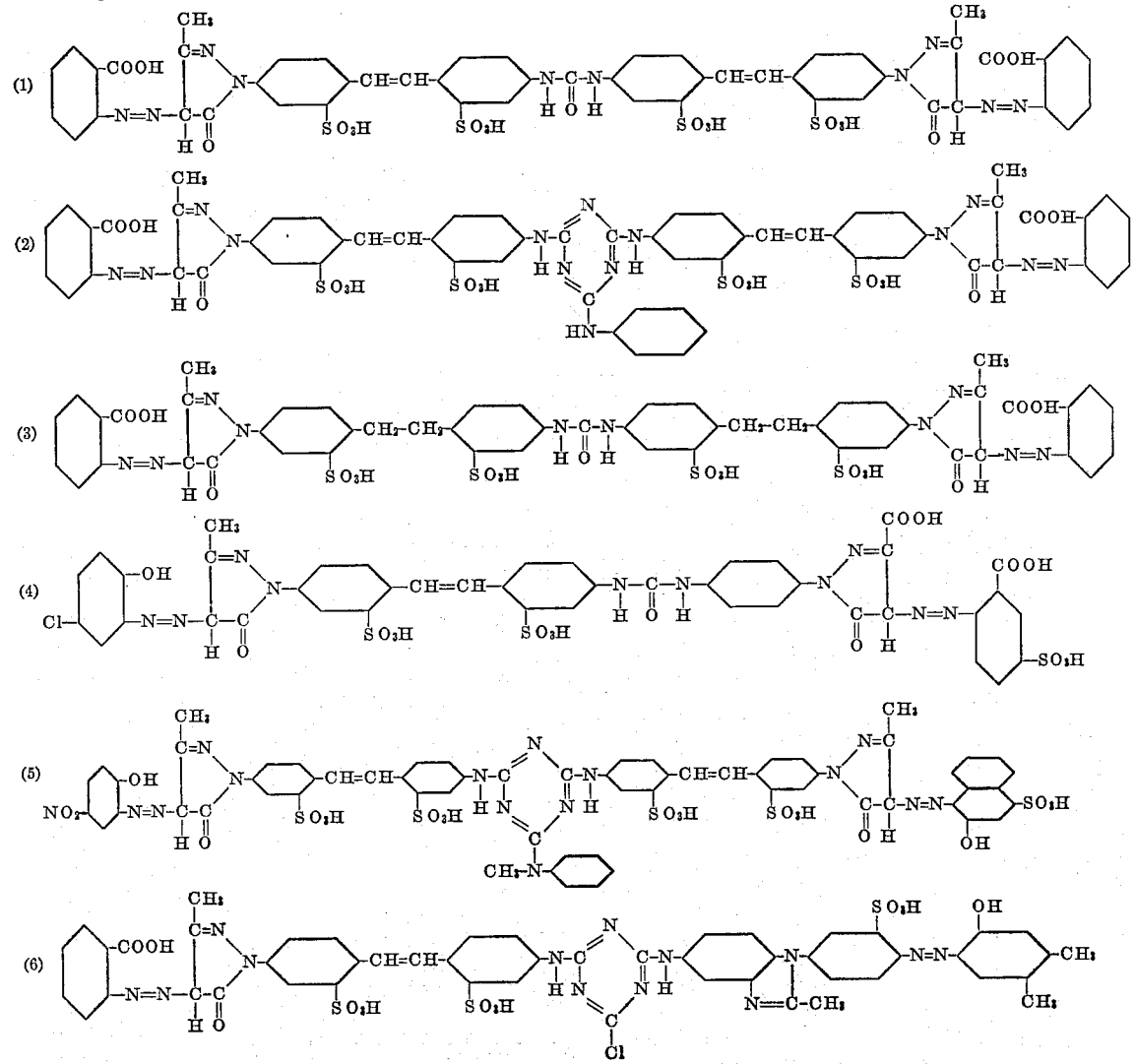

stands for the residue of a 5-pyrazolone which is combined in 1-position with the residue

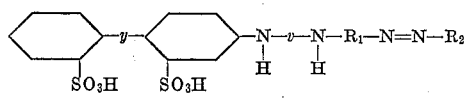

and in 4-position with the azo-residue, y stands for a CH=CH- or a CH₂—CH₂-group, v for a member of the group consisting of CO and a connecting member consisting of a heterocyclic six membered nucleus which consists of at least 3 and at the most 4 carbon atoms and of at least 2 and at the most 3 nitrogen atoms, the nitrogen atoms being separated from one another by at least one carbon atom, one carbon atom adjacent to one nitrogen atom being linked by a

group to the radical containing the pyrazolone nucleus and another carbon atom adjacent to one nitrogen atom being linked by the

group to R₁, R₁ standing for a complex consisting of at least one aromatic nucleus and at least one heterocyclic nucleus, and R₂ for an aromatic nucleus selected from the group consisting of aromatic nuclei of the benzene and naphthalene series.

The characteristic properties of the new dyestuffs are conditioned by the grouping

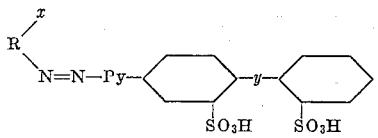

which in particular is responsible for the shade of the dyestuffs, their affinity for vegetable fibers, and the high fastness to light of the dyeings after-treated with metal, as will be evident from a comparison of the properties of the individual products described in the examples which follow.

When prepared in substance the new products constitute in the dry state yellow to brown or blackish powders which are soluble in water to yellow to orange, brown, greenish, olive and blackish solutions from which they are adsorbed by cellulose fibres yielding dyeings of similar shades if after-treated with agents yielding metal, which are distinguished by their excellent properties hereinbefore referred to. Details in respect of the manufacture of such dyestuffs and of their properties will be found in the following examples, the number of which could be multiplied as desired. The parts in the examples are by weight.

In all the examples, the formulas given represent the products in their free states.

*Example 1*

13.7 parts of 1-aminobenzene-2-carboxylic acid diazotized in the usual manner and coupled in an acetic acid medium with 45.1 parts of the 3-methyl-5-pyrazolone of the formula

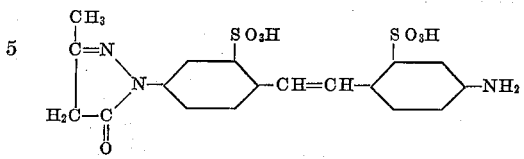

The dyestuff is isolated, dissolved in 1000 parts of water, containing an excess of sodium carbonate, and the solution is treated with phosgene at 4050° C. When this treatment is ended, that is to say when a free amino-group is no longer present, the dyestuff is isolated and dried. It is a yellow powder which dyes cotton fast yellow shades which become very fast to light by after-coppering. The dyestuff corresponds to the formula

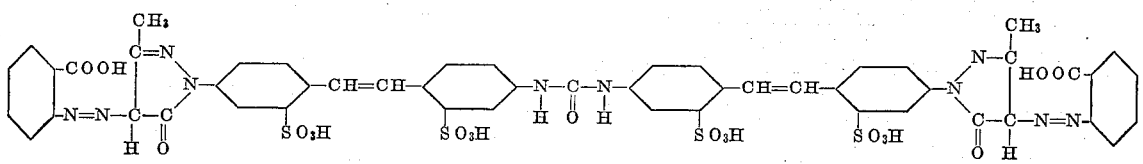

By combining the diazo compound from 13.7 parts of 1-aminobenzene-2-carboxylic acid with 45.3 parts of the 3-methyl-5-pyrazolone of the formula

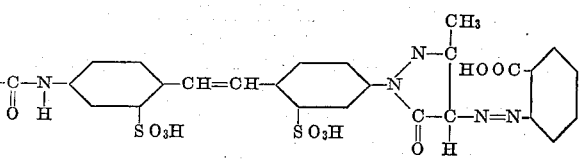

and treating the dyestuff with phosgene there is obtained a dyestuff which, when dried, constitutes a yellow-brown powder and dyes cotton yellow shades, resembling in shade and properties those of the stilbene product.

Fast yellow shades with a somewhat orange hue are obtained by dyeing with the non-metallized dyestuff in the manner usual for dyeing with direct dyestuffs and then after-coppering or after-treating the dyeing with a nickel salt. By treating with an iron salt a dyeing prepared with the dyestuff there is obtained a dull yellow shade, by treatment with a cobalt salt a yellow shade, with a chromium salt a somewhat greenish-yellow shade and with a manganese salt a yellow shade.

*Example 2*

45 parts of the 3-methyl-5-pyrazolone of the formula

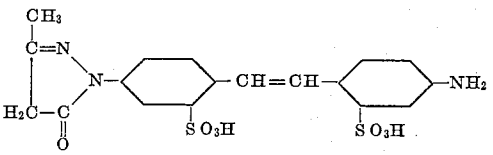

or of the formula

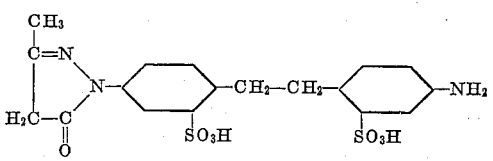

are dissolved in 500 parts of water and 11 parts of sodium carbonate and converted into the corresponding urea by the introduction of phosgene at a temperature of 40-50° C. When the free amino-group has disappeared the urea is isolated.

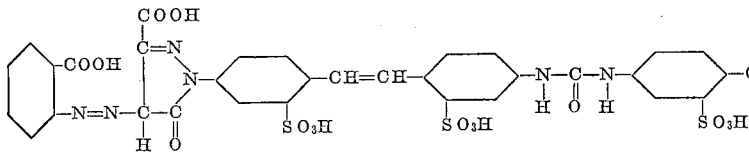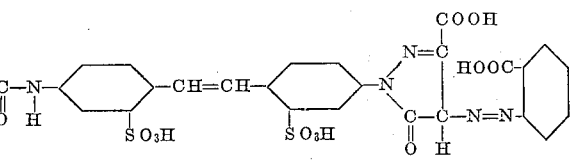

46.2 parts of the urea thus obtained are dissolved in water together with the quantity of sodium carbonate necessary for forming the sodium salt, 13.6 parts of sodium acetate are added and the solution is coupled in the usual manner with a solution of the diazo compound from 13.7 parts of 1-aminobenzene-2-carboxylic acid. When the diazo compound has disappeared the whole is made alkaline with ammonia, gently heated and filtered after the addition of common salt. The dyestuff thus obtained shows the same behaviour as the dyestuff described in the preceding example. The replacement of phosgene by thiophosgene leads to a similar product. So also dyes the replacement of the 1-aminobenzene-2-carboxylic acid by the 1-amino-4-chlorobenzene-2-carboxylic acid, by 1-amino-4-nitrobenzene-2-carboxylic acid, by 1-amino-4-methylbenzene-2-carboxylic acid or by 1-amino-4-ethoxy-benzene-2-carboxylic acid.

If there is used as parent material for making the metalliferous dyestuff the 3-carboxy-5-pyrazolone of the formula

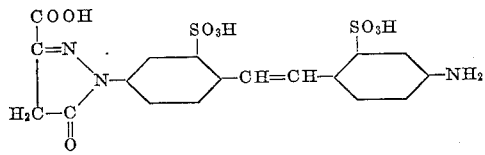

obtainable by condensation of the corresponding hydrazine with oxalacetic ester or its sodium compound and saponification of the carboxylic ester group, or the 3-phenyl-5-pyrazolone of the formula

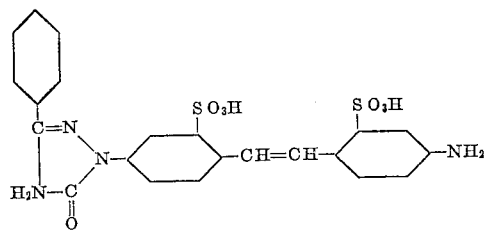

(obtainable from benzoylacetic ester), dyestuffs having similar valuable properties are obtained. The formula of a dyestuff of this group is for instance Quite similar dyestuffs are obtained if the CO-group of the urea residue is replaced by a heterocyclic amidine-like nucleus. Such a product can be obtained, for example, by adding 90.2 parts of the 3-methyl-5-pyrazolone named in the first paragraph of this example to a fine aqueous suspension of 18.4 parts of cyanuric chloride, care being taken to keep the reaction mass just neutral by the addition of a sodium carbonate solution. When no more sodium carbonate is consumed the secondary condensation product from 2 mols of the pyrazolone and 1 mol of cyanuric chloride has been formed. If required, this secondary product can be converted into a tertiary condensation product by replacing the remaining chlorine atom in the cyanuric ring by treatment with 9.3 parts of aniline in known manner. If now the sodium salt from 53.5 parts of this condensation product is combined with the diazo compound from 13.7 parts of 1-aminobenzene-2-carboxylic acid there is obtained a dyestuff which resembles the azo-dyestuff of Example 1. The after-coppered dyeing on cotton shows for instance yellow shades very fast to light. The formula of the dyestuff is therefore:

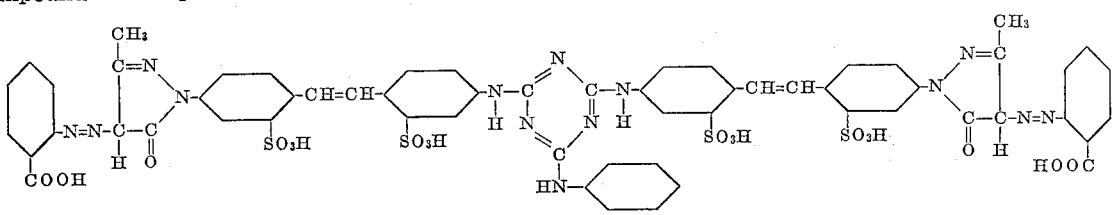

If in the preparation of such dyestuffs or of the condensation products from amino-aryl-pyrazolone and cyanuric chloride from which they are derived the 18.4 parts of cyanuric chloride are replaced by 11.5 parts of 2:6-dichloro-4-methyl-pyrimidine or 19.9 parts of dichloro-quinazoline or 21.4 parts of phenylchlorotriazine, dyestuffs having very similar properties are obtained. The formula of such a dyestuff is:

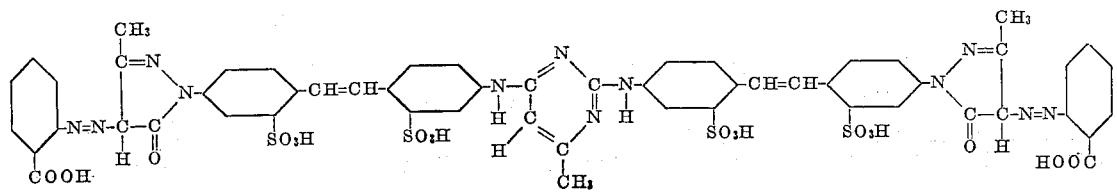

It dyes cotton yellow tints which become fast to light by after-coppering. If half of the 1-aminobenzene-2-carboxylic acid which is employed for the preparation of this dyestuff is replaced by the corresponding quantity of 1-amino-2-hydroxybenzene-5-sulfonic acid there is obtained a dyestuff of the formula:

nol is replaced by one of its substitution products, such as 4-chloro-2-amino-1-hydroxybenzene or 4- or 5-nitro-2-amino-1-hydroxy-benzene, or by one of the other ortho-hydroxyamino compounds of the benzene or naphthalene series named in the introduction, dyestuffs are obtained which can like-wise be converted on the fiber into com-

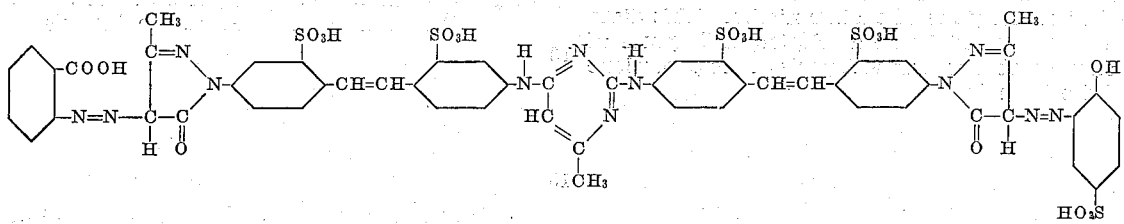

which dyes cotton yellow-orange tints which become fast to light by after-coppering.

*Example 3*

92:3 parts of the 3-methyl-5-pyrazolone of the formula plex copper or other metal compounds. In this connection the following may be said.

Whilst replacement of the 1-amino-2-carboxylic acid by the aforesaid substitution products of this body influences the shade of the final dyestuff only to a small extent, substantial displace-

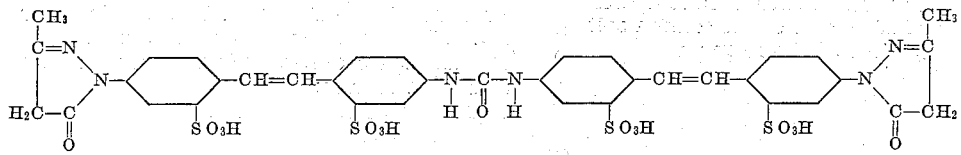

in the form of the neutral sodium salt are dissolved in water together with the necessary quantity of sodium carbonate, and after addition of 13.6 parts of crystallized sodium acetate the solution is coupled with the diazo compound from 13.7 parts of 1-aminobenzene-2-carboxylic acid. After some time 11.6 parts of sodium carbonate are added to the suspension of the monoazodyestuff. The mono-azo-dyestuff thereupon dissolves and is then further coupled with a diazo solution prepared as usual from 18.9 parts of 1-hydroxy-2-aminobenzene-4-sulfonic acid. The dyestuff is isolated by salting-out, filtered with suction and dried. When dry it is a dark brown powder which dyes cotton and similar fibres yellow-brown shades which become very fast to light when after-coppered.

The dyestuff thus obtained has the formula ment of the shade can be obtained by suitable selection of the ortho-hydroxy-diazo compound, whereby, for instance, products which dye orange, to brown-yellow and reddish shades can be prepared. Thus for example, the copper compound of the product from 1 mol of the pyrazolone-urea derivative of the first paragraph of this example with 1 mol of diazotized 1-amino-2-carboxylic acid and 1 mol of diazotized 5-nitro-2-amino-1-hydroxy-benzene, when formed on the fiber, dyes brown-yellow shades. Replacement of the 5-nitro-2-amino-1-hydroxybenzene derivative by diazotized 1-amino-2-hydroxynaphthalene-4-sulfonic acid leads on the fiber to a copper compound which dyes reddish-brown shades.

If in this example the 3-methyl-5-pyrazolone is replaced by the corresponding 5-pyrazolone-3-carboxylic acid there are obtained analogous

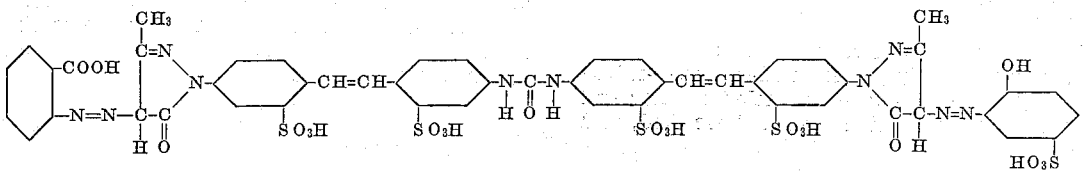

By treating the dyestuff of the above formula on the fiber with agents yielding copper, there are obtained brown-yellow shades. With other metals than copper, such as salts of manganese, iron, cobalt, nickel, chromium, and so on, there are obtained similar yellow-brown shades.

If in the present Example the 1-aminobenzene-2-carboxylic acid is replaced by a substituted anthranilic acid such as 1-amino-4-chlorobenzene-2-carboxylic acid or 1-amino-4-nitrobenzene-2-carboxylic acid and the ortho-aminophedyestuffs which, especially if after-coppered on the fiber, dye vegetable fibres shades which are extremely fast to light. Furthermore, the derivatives of the other 1-aryl-5-pyrazolones referred to in Example 2 lead to similar products.

If in the preparation of the dyestuffs from the urea pyrazolone derivatives of the present example the 1-aminobenzene-2-carboxylic acid is also replaced by an ortho-aminophenol, dyestuffs dyeing darker shades are obtained. Thus, the dyestuff of the formula

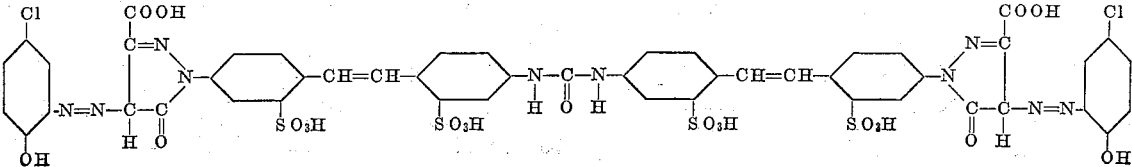

if treated on the fiber with agents yielding copper, dyes cotton brown-red.

Example 4

13.7 parts of 1-aminobenzene-2-carboxylic acid are dissolved in 30 parts of concentrated hydrochloric acid and after addition of ice the solution is diazotized at 5° C. with a concentrated aqueous solution of 7 parts of sodium nitrite. This diazo solution is poured into a solution of 21 parts of sodium carbonate and 45.1 parts of the pyrazolone of the formula

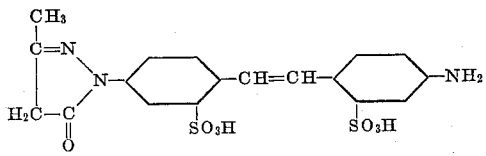

in 500 parts of water and some ice. To the coupling product thus obtained there is then added at 0–5° C. a suspension of 18.4 parts of cyanuric chloride in ice water. The whole is stirred for about one hour until the condensation is complete, and to this mixture there is then poured a solution of 45.2 parts of the sodium salt of the aminoazo-dyestuff of the formula

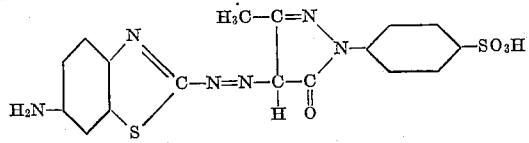

in 500 parts of water.

The whole is heated to 40° C. and stirred for some hours until the condensation is finished, whereupon 5 parts of sodium carbonate dissolved in little water and 18 parts of aniline are added to the mixture, which is then further heated for 1 hour at 90° C. 6 parts of sodium carbonate are then strewn into the mixture and the dyestuff is salted out, filtered and dried. It dyes cotton yellow tints.

The aminoazo-dyestuff of the formula

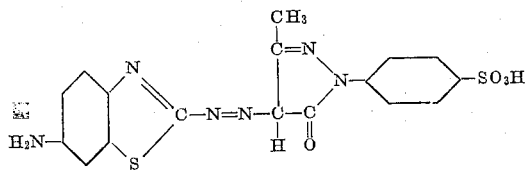

is obtained in the following manner:

19.5 parts of finely pulverized 2-amino-7-nitrobenzthiazole are suspended in little ice water and 30 parts of concentrated hydrochloric acid, and the suspension is diazotized at 10° C. with a concentrated aqueous solution of 7 parts of sodium nitrite. The diazo paste thus obtained is poured into a solution of 16 parts of sodium carbonate and 25.4 parts of 1-phenyl-3-methyl-5-pyrazolone-4'-sulfonic acid in 150 parts of water and little ice. When coupling is complete there are added 40 parts of crystallized sodium sulfide, the whole is heated for two hours at 60° C., and the aminoazo-dyestuff is salted out.

Example 5

66.5 parts of the sodium salt of the monoazo-dyestuff from 1-aminobenzene-2-carboxylic acid

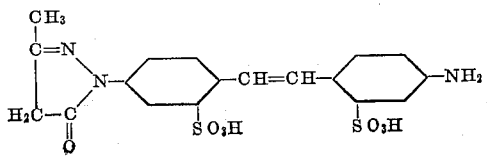

and the pyrazolone of the formula are dissolved in 500 parts of water and so much ice is added that the temperature falls to 0° C. A suspension of 18.4 parts of cyanuric chloride in ice water is poured into this solution and the whole is stirred for about 1 hour until complete condensation has taken place. It is then neutralized with 5 parts of sodium carbonate. 61.4 parts of the sodium salt of the aminoazo-dyestuff of the formula

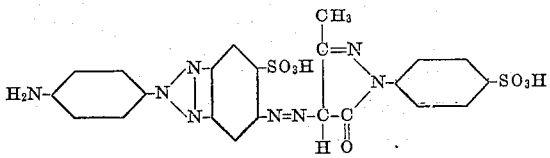

are dissolved in 500 parts of water and this solution is poured into the condensation product. The solution is heated for some hours to 40° C. until no free amino-group can be detected. A solution of 5 parts of sodium carbonate in water and then 18 parts of aniline are added and the whole is heated to 90° C. 6 parts of sodium carbonate are strewn into the mixture and the dyestuff thus obtained is salted out, filtered and dried. It dyes cotton yellow orange tints.

The aminoazo-dyestuff of the above formula is prepared as follows:

33.5 parts of the azimide-sulfonic acid of the formula

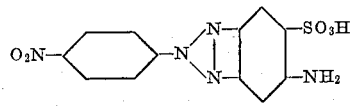

(obtainable in known manner by oxidation of the azo-dyestuff from para-nitrodiazobenzene and meta-phenylenediamine sulfonic acid) are dissolved in 150 parts of water and 14 parts of caustic soda solution of 30 per cent. strength. 7 parts of sodium nitrite are added to this solution and the whole is poured into a mixture of 40 parts of concentrated hydrochloric acid and ice, whereupon it is stirred at 10° C. until diazotization is complete. 25.4 parts of 1-phenyl-3-methyl-5-pyrazolone-4'-sulfonic acid are dissolved in a solution of 16 parts of sodium carbonate in 150 parts of water and little ice and the diazo paste is then added to this solution while stirring well. When coupling is complete there are added 40 parts of crystallized sodium sulfide. The whole is then heated for 2 hours at 60° C. and the aminoazo-dyestuff is salted out.

What I claim is:

1. The azo-dyestuffs having in the free state the general formula

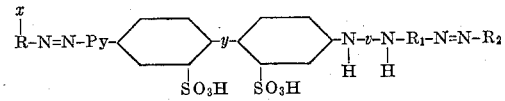

in which R stands for a nucleus of the group consisting of aromatic nuclei of the benzene and naphthalene series, $x$ stands for a lake-forming group in ortho-position to the —N=N— group, Py stands for the radical of a 5-pyrazolone which is combined in 1-position with the radical

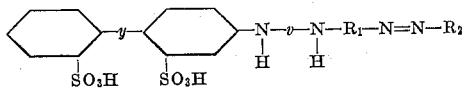

and in 4-position with the azo-group, $y$ stands for a connecting link of the group consisting of —CH=CH— and —CH$_2$—CH$_2$—, $v$ for a member of the group consisting of CO and a connecting member consisting of a heterocyclic six membered nucleus which consists of at least 3 and at the most 4 carbon atoms and of at least 2 and at the most 3 nitrogen atoms, the nitrogen atoms being separated from one another by at least one carbon atom, one carbon atom adjacent to one nitrogen atom being linked by a

group to the radical containing the pyrazolone nucleus and another carbon atom adjacent to one nitrogen atom being linked by the

group to $R_1$, $R_1$ standing for a complex consisting of at least one aromatic nucleus and at least one heterocyclic nucleus, and $R_2$ for an aromatic nucleus selected from the group consisting of aromatic nuclei of the benzene and naphthalene series, which products form yellow to brown powders, dissolve in water to yellow to orange, brown and olive solutions, and dye cotton yellow to orange, brown and olive tints which become particularly fast to light by after-coppering.

2. The azo-dyestuffs having in the free state the general formula

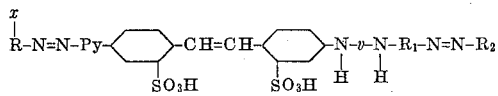

in which R stands for a nucleus of the group consisting of aromatic nuclei of the benzene and naphthalene series, $x$ stands for a lake-forming group in ortho-position to the —N=H—group, Py stands for the radical of a 5-pyrazolone which is combined in 1-position with the radical

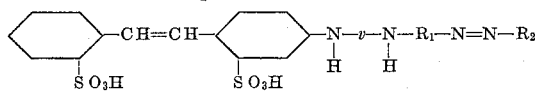

and in 4-position with the azo-group, $v$ for a member of the group consisting of CO and a connecting member consisting of a heterocyclic six membered nucleus which consists of at least 3 and at the most 4 carbon atoms and of at least 2 and at the most 3 nitrogen atoms, the nitrogen atoms being separated from one another by at least one carbon atom, one carbon atom adjacent to one nitrogen atom being linked by a

group to the radical containing the pyrazolone nucleus and another carbon atom adjacent to one nitrogen atom being linked by the

group to $R_1$, $R_1$ standing for a complex consisting of at least one aromatic nucleus and at least one heterocyclic nucleus, and $R_2$ for an aromatic nucleus selected from the group consisting of aromatic nuclei of the benzene and naphthalene series, which products form yellow to brown powders, dissolve in water to yellow to orange, brown and olive solutions, and dye cotton yellow to orange, brown and olive tints which become particularly fast to light by after-coppering.

3. The azo-dyestuffs having in the free state the general formula

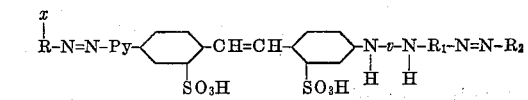

in which R stands for a nucleus of the group consisting of aromatic nuclei of the benzene and naphthalene series, $x$ stands for a lake-forming group in ortho-position to the —N=N—group, Py stands for the radical of a 5-pyrazolone which is combined in 1-position with the radical

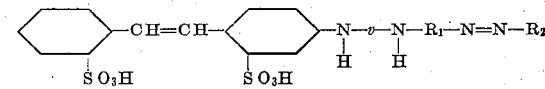

and in 4-position with the azo-group, $v$ for a member of the group consisting of CO and a connecting member consisting of a heterocyclic six membered nucleus which consists of at least 3 and at the most 4 carbon atoms and of at least 2 and at the most 3 nitrogen atoms, the nitrogen atoms being separated from one another by at least one carbon atom, one carbon atom adjacent to one nitrogen atom being linked by the

group to the radical containing the pyrazolone nucleus and another carbon atom adjacent to one nitrogen atom being linked by the

group to the complex $R_1$, $R_1$ standing for a complex consisting of at least one aromatic nucleus and one pyrazolone nucleus, and $R_2$ for an aromatic nucleus of the group consisting of aromatic nuclei of the benzene and naphthalene series, which products form yellow to brown powders, dissolve in water to yellow to orange, brown and olive solutions, and dye cotton yellow to orange, brown and olive tints which become particularly fast to light, by after-coppering.

4. The azo-dyestuffs having in the free state the general formula

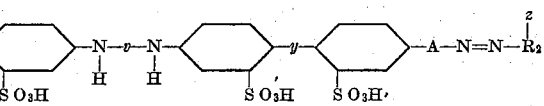

in which $R_1$ and $R_2$ stand for nuclei of the group consisting of aromatic nuclei of the benzene and naphthalene series, $x$ and $z$ stand for lake-forming groups in ortho-position to the —N=N— groups, Py and A stand for radicals of 5-pyrazolones which are combined in 1-position with the radical

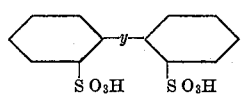

and in 4-position with the azo-groups, $y$ stands for a connecting link of the group consisting of —CH=CH— and $CH_2$—$CH_2$—, and $v$ for a member of the group consisting of CO and a connecting member consisting of a heterocyclic six membered nucleus which consists of at least 3 and at the most 4 carbon atoms and of at least 2 and at the most 3 nitrogen atoms, the nitrogen atoms being separated from one another by at least one carbon atom, two carbon atoms adjacent each to one nitrogen atom being linked by the

groups to the radicals

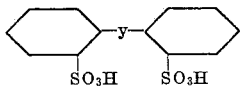

which products form yellow to brown powders, dissolve in water to yellow to orange, brown and olive solutions, and dye cotton yellow to orange, brown and olive tints which become particularly fast to light by after-coppering.

5. The azo-dyestuffs having in the free state the general formula

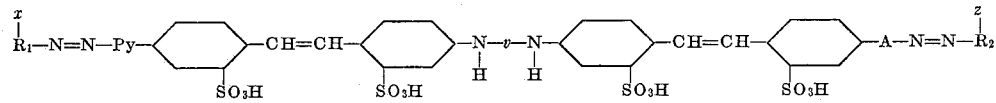

in which $R_1$ and $R_2$ stand for nuclei of the group consisting of aromatic nuclei of the benzene and naphthalene series, $x$ and $z$ stand for lake-forming groups in ortho-position in the —N=N— groups, Py and A stand for radicals of 5-pyrazolones which are combined in 1-position with the radical

and in 4-position with the azo-groups, and $v$ for a member of the group consisting of CO and a connecting member consisting of a heterocyclic six membered nucleus which consists of at least 3 and at the most 4 carbon atoms and of at least 2 and at the most 3 nitrogen atoms, the nitrogen atoms being separated from one another by at least one carbon atom, two carbon atoms adjacent each to one nitrogen atom being linked by the

groups to the radicals

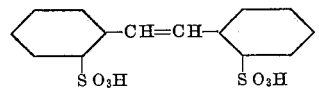

which products form yellow to brown powders, dissolve in water to yellow to orange, brown and olive solutions, and dye cotton yellow to orange, brown and olive tints which become particularly fast to light by after-coppering.

6. The dyestuffs having in the free state the formula

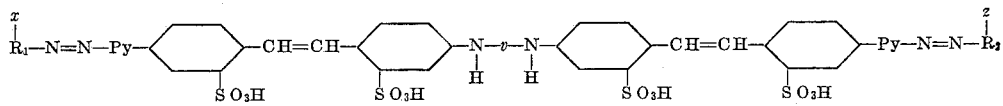

in which $R_1$ and $R_2$ stand for nuclei of the benzene series, $x$ and $z$ stand for lake-forming groups in ortho-position to the —N=N—groups, $v$ stands for a connecting member consisting of a 1:3′5 triazine compound, two carbon atoms of the triazine nucleus being linked each to the

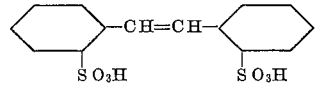

group, Py stands for the radical of a 5-pyrazolone which is linked in 1 position to the radical

and in 4-position to the azo group, which products form yellow to brown powders, dissolve in water to yellow to orange and brown solutions and dye cotton similar tints which become fast to light by after-coppering.

7. The azo-dyestuff having in the free state the formula

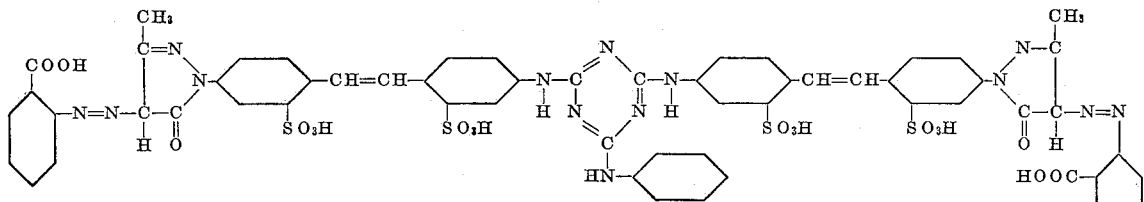

which yields on the vegetable fiber yellow tints which become fast to light by after-coppering.

MAX SCHMID.